(12) United States Patent
Hintzer et al.

(10) Patent No.: US 8,404,790 B2
(45) Date of Patent: Mar. 26, 2013

(54) AQUEOUS EMULSION POLYMERIZATION PROCESS FOR PRODUCING FLUOROPOLYMERS

(75) Inventors: Klaus Hintzer, Kastl (DE); Michael Jürgens, Neuoetting (DE); Harald Kaspar, Burgkirchen (DE); Kai H. Lochhaas, Neuoetting (DE); Andreas R. Maurer, Langenneufnach (DE); Werner Schwertfeger, Altoetting (DE); Tilman C. Zipplies, Burghausen (DE)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 13/403,724

(22) Filed: Feb. 23, 2012

(65) Prior Publication Data

US 2012/0190807 A1 Jul. 26, 2012

Related U.S. Application Data

(62) Division of application No. 11/457,239, filed on Jul. 13, 2006, now abandoned.

(30) Foreign Application Priority Data

| Jul. 15, 2005 | (GB) | 0514387.0 |
| Jul. 15, 2005 | (GB) | 0514398.7 |
| Nov. 24, 2005 | (GB) | 0523853.0 |
| Dec. 21, 2005 | (GB) | 0525978.3 |

(51) Int. Cl.
*C08F 14/18* (2006.01)
(52) U.S. Cl. ......... 526/209; 526/214; 526/242
(58) Field of Classification Search .......... 526/209, 526/214, 242; 524/805; 568/615, 677; 562/586, 562/587, 605
See application file for complete search history.

(56) References Cited

U.S. PATENT DOCUMENTS

| 2,516,127 A | 7/1950 | Lauer et al. |
| 2,534,058 A | 12/1950 | Renfrew |
| 2,559,749 A | 7/1951 | Benning |
| 2,559,752 A | 7/1951 | Berry |
| 2,713,593 A | 7/1955 | Brice et al. |
| 3,037,953 A | 6/1962 | Marks et al. |
| 3,142,665 A | 7/1964 | Cardinal et al. |
| 3,179,614 A | 4/1965 | Edwards |
| 3,260,691 A | 7/1966 | Lavin et al. |
| 3,271,341 A | 9/1966 | Garrison |
| 3,315,201 A | 4/1967 | Werme |
| 3,316,201 A | 4/1967 | Hahn et al. |
| 3,345,317 A | 10/1967 | Hoashi |
| 3,391,099 A | 7/1968 | Punderson |
| 3,451,908 A | 6/1969 | Sianesi et al. |
| 3,489,595 A | 1/1970 | Brown, Jr. |
| 3,555,100 A | 1/1971 | Garth et al. |
| 3,635,926 A | 1/1972 | Gresham et al. |
| 3,642,742 A | 2/1972 | Carlson |
| 3,721,696 A | 3/1973 | Sianesi et al. |
| 3,790,403 A | 2/1974 | Ribbans, III |
| 3,816,524 A | 6/1974 | Brinstead |
| 3,855,191 A | 12/1974 | Doughty, Jr. et al. |
| 3,882,153 A | 5/1975 | Seki et al. |
| 3,981,945 A | 9/1976 | Attwood et al. |
| 3,997,599 A | 12/1976 | Grinstead |
| 4,005,137 A | 1/1977 | Rudolph et al. |
| 4,010,156 A | 3/1977 | Nudelman et al. |
| 4,016,345 A | 4/1977 | Holmes |
| 4,025,709 A | 5/1977 | Blaise et al. |
| 4,049,681 A | 9/1977 | Dietrich et al. |
| 4,049,863 A | 9/1977 | Vassiliou |
| 4,060,535 A | 11/1977 | Cinco |
| 4,089,804 A | 5/1978 | Falk |
| 4,123,401 A | 10/1978 | Berghmans et al. |
| 4,131,711 A | 12/1978 | Attwood |
| 4,138,373 A | 2/1979 | Ukihashi et al. |
| 4,180,609 A | 12/1979 | Vassiliou |
| 4,252,859 A | 2/1981 | Concannon et al. |
| 4,262,101 A | 4/1981 | Hartwimmer et al. |
| 4,282,162 A | 8/1981 | Kuhls |
| 4,287,112 A | 9/1981 | Berghmans |
| 4,292,402 A | 9/1981 | Pollet et al. |
| 4,320,205 A | 3/1982 | Asawa et al. |
| 4,342,825 A | 8/1982 | Van Poucke et al. |
| 4,353,950 A | 10/1982 | Vassiliou |
| 4,369,266 A | 1/1983 | Kuhls et al. |
| 4,380,618 A | 4/1983 | Khan et al. |
| 4,381,384 A | 4/1983 | Khan |
| 4,391,940 A | 7/1983 | Kuhls et al. |
| 4,425,448 A | 1/1984 | Concannon et al. |
| 4,439,385 A | 3/1984 | Kuhls et al. |
| 4,499,249 A | 2/1985 | Nakagawa et al. |
| 4,544,458 A | 10/1985 | Grot et al. |
| 4,548,986 A | 10/1985 | Suzuki et al. |
| 4,552,925 A | 11/1985 | Nakagawa et al. |
| 4,588,796 A | 5/1986 | Wheland |
| 4,603,118 A | 7/1986 | Staab |
| 4,605,773 A | 8/1986 | Maloney et al. |
| 4,618,641 A | 10/1986 | Hengel |
| 4,621,116 A | 11/1986 | Morgan |
| 4,623,487 A | 11/1986 | Cope |
| 4,639,337 A | 1/1987 | Cope et al. |
| 4,766,190 A | 8/1988 | Morita et al. |

(Continued)

FOREIGN PATENT DOCUMENTS

| BE | 834885 | 4/1976 |
| CA | 1044256 | 12/1978 |

(Continued)

OTHER PUBLICATIONS

ASTM D 4895-04, "Standard Specification for Polytetrafluoroethylene (PTFE) Resin Produced From Dispersion", pp. 1-14, 2006.

(Continued)

*Primary Examiner* — Mark Eashoo
*Assistant Examiner* — Nicole M Buie-Hatcher
(74) *Attorney, Agent, or Firm* — C. Michael Geise

(57) ABSTRACT

A method of making a fluoropolymer in the presence of a fluorinated surfactant.

16 Claims, No Drawings

U.S. PATENT DOCUMENTS

| | | | |
|---|---|---|---|
| 4,777,304 A | 10/1988 | Schweighardt | |
| 4,789,717 A | 12/1988 | Giannetti et al. | |
| 4,832,879 A | 5/1989 | Hamprecht | |
| 4,847,135 A | 7/1989 | Braus et al. | |
| 4,861,845 A | 8/1989 | Slocum et al. | |
| 4,864,006 A | 9/1989 | Giannetti et al. | |
| 4,925,709 A | 5/1990 | Shmueli | |
| 4,987,254 A | 1/1991 | Schwertfeger et al. | |
| 5,017,480 A | 5/1991 | Mori et al. | |
| 5,068,043 A | 11/1991 | Thigpen et al. | |
| 5,075,397 A | 12/1991 | Tonelli et al. | |
| 5,090,613 A | 2/1992 | Lee | |
| 5,153,322 A | 10/1992 | Flynn | |
| 5,160,791 A | 11/1992 | Tannenbaum | |
| 5,168,107 A | 12/1992 | Tannenbaum | |
| 5,182,342 A | 1/1993 | Feiring et al. | |
| 5,198,491 A | 3/1993 | Honda et al. | |
| 5,219,910 A | 6/1993 | Stahl et al. | |
| 5,223,343 A | 6/1993 | Tannenbaum | |
| 5,229,480 A | 7/1993 | Uschold | |
| 5,230,961 A | 7/1993 | Tannenbaum | |
| 5,272,186 A | 12/1993 | Jones | |
| 5,285,002 A | 2/1994 | Grootaert | |
| 5,312,935 A | 5/1994 | Mayer et al. | |
| 5,442,097 A | 8/1995 | Obermeier et al. | |
| 5,447,982 A | 9/1995 | Kamba et al. | |
| 5,453,477 A | 9/1995 | Oxenrider et al. | |
| 5,463,021 A | 10/1995 | Beyer et al. | |
| 5,478,651 A | 12/1995 | Tannenbaum | |
| 5,488,142 A | 1/1996 | Fall et al. | |
| 5,498,680 A | 3/1996 | Abusleme et al. | |
| 5,530,078 A | 6/1996 | Felix et al. | |
| 5,532,310 A | 7/1996 | Grenfell et al. | |
| 5,562,991 A | 10/1996 | Tannenbaum | |
| 5,576,381 A | 11/1996 | Bladel et al. | |
| 5,591,877 A | 1/1997 | Obermeier et al. | |
| 5,608,022 A | 3/1997 | Nakayama et al. | |
| 5,656,201 A | 8/1997 | Visca et al. | |
| 5,663,255 A | 9/1997 | Anolick et al. | |
| 5,667,846 A | 9/1997 | Thomas | |
| 5,688,884 A | 11/1997 | Baker et al. | |
| 5,698,635 A | 12/1997 | Kruger et al. | |
| 5,700,859 A | 12/1997 | Ogura et al. | |
| 5,710,345 A | 1/1998 | Navarrini et al. | |
| 5,721,053 A | 2/1998 | Thomas | |
| 5,763,552 A | 6/1998 | Feiring et al. | |
| 5,789,083 A | 8/1998 | Thomas | |
| 5,789,508 A | 8/1998 | Baker et al. | |
| 5,804,650 A | 9/1998 | Tsuda et al. | |
| 5,874,469 A | 2/1999 | Maniar | |
| 5,895,799 A | 4/1999 | Wu et al. | |
| 5,955,556 A | 9/1999 | McCarthy et al. | |
| 5,959,026 A | 9/1999 | Abusleme et al. | |
| 5,969,063 A | 10/1999 | Parker et al. | |
| 5,990,330 A | 11/1999 | Sulzbach et al. | |
| 6,013,795 A | 1/2000 | Manzara et al. | |
| 6,025,307 A | 2/2000 | Chittofrati et al. | |
| 6,025,441 A | 2/2000 | Koshirai et al. | |
| 6,037,399 A | 3/2000 | Wu et al. | |
| 6,103,843 A | 8/2000 | Abusleme et al. | |
| 6,103,844 A | 8/2000 | Brothers | |
| 6,126,849 A | 10/2000 | Yamana et al. | |
| 6,136,893 A | 10/2000 | Yamashita et al. | |
| 6,153,688 A | 11/2000 | Miura et al. | |
| 6,218,464 B1 | 4/2001 | Parker et al. | |
| 6,245,923 B1 | 6/2001 | Sulzbach et al. | |
| 6,255,384 B1 | 7/2001 | McCarthy et al. | |
| 6,255,536 B1 | 7/2001 | Worm et al. | |
| 6,267,865 B1 | 7/2001 | Polson et al. | |
| 6,365,684 B1 | 4/2002 | McCarthy et al. | |
| 6,376,710 B2 | 4/2002 | Matsumoto et al. | |
| 6,391,182 B2 | 5/2002 | Smeltzer et al. | |
| 6,395,848 B1 | 5/2002 | Morgan et al. | |
| 6,410,626 B1 | 6/2002 | Wada et al. | |
| 6,429,258 B1 | 8/2002 | Morgan et al. | |
| 6,436,244 B1 | 8/2002 | Führer et al. | |
| 6,482,979 B1 | 11/2002 | Hintzer et al. | |
| 6,503,988 B1 | 1/2003 | Kitahara et al. | |
| 6,512,063 B2 | 1/2003 | Tang | |
| 6,512,089 B1 | 1/2003 | Hintzer et al. | |
| 6,518,442 B1 | 2/2003 | Felix et al. | |
| 6,576,703 B2 | 6/2003 | Kapeliouchko et al. | |
| 6,593,416 B2 | 7/2003 | Grootaert et al. | |
| 6,602,968 B1 | 8/2003 | Bekiarian et al. | |
| 6,610,788 B1 | 8/2003 | Takakura et al. | |
| 6,613,941 B1 | 9/2003 | Felix et al. | |
| 6,624,268 B1 | 9/2003 | Maekawa et al. | |
| 6,632,508 B1 | 10/2003 | Pellerite et al. | |
| 6,642,307 B1 | 11/2003 | Sogabe et al. | |
| 6,642,415 B1 | 11/2003 | Fuhrer et al. | |
| 6,660,798 B1 | 12/2003 | Marchese et al. | |
| 6,677,414 B2 | 1/2004 | Hintzer et al. | |
| 6,686,427 B2 | 2/2004 | Katsurao et al. | |
| 6,689,854 B2 | 2/2004 | Fan et al. | |
| 6,693,152 B2 | 2/2004 | Kaspar et al. | |
| 6,703,520 B2 | 3/2004 | Hintzer et al. | |
| 6,706,193 B1 | 3/2004 | Burkard et al. | |
| 6,710,123 B1 | 3/2004 | Amin-Sanayei et al. | |
| 6,715,877 B2 | 4/2004 | Molebny | |
| 6,716,942 B1 | 4/2004 | Saito et al. | |
| 6,720,437 B2 | 4/2004 | Jones et al. | |
| 6,729,437 B1 | 5/2004 | Apple | |
| 6,730,760 B2 | 5/2004 | Grootaert et al. | |
| 6,737,489 B2 | 5/2004 | Linert et al. | |
| 6,750,304 B2 | 6/2004 | Kaspar et al. | |
| 6,761,964 B2 | 7/2004 | Tannenbaum | |
| 6,774,164 B2 | 8/2004 | Lyons et al. | |
| 6,794,550 B2 | 9/2004 | Hintzer et al. | |
| 6,815,040 B2 | 11/2004 | Pellerite et al. | |
| 6,822,059 B2 | 11/2004 | Buckanin et al. | |
| 6,825,250 B2 | 11/2004 | Epsch et al. | |
| 6,833,403 B1 | 12/2004 | Blädel et al. | |
| 6,846,570 B2 | 1/2005 | Leech et al. | |
| 6,861,466 B2 | 3/2005 | Dadalas et al. | |
| 6,861,490 B2 | 3/2005 | Kaspar et al. | |
| 6,869,997 B2 | 3/2005 | Wille et al. | |
| 6,878,772 B2 | 4/2005 | Visca et al. | |
| 6,956,078 B2 | 10/2005 | Cavanaugh et al. | |
| 6,972,094 B2 | 12/2005 | Ichida et al. | |
| 7,018,541 B2 | 3/2006 | Hintzer et al. | |
| 7,019,163 B2 | 3/2006 | Uematsu et al. | |
| 7,026,036 B2 | 4/2006 | Leech et al. | |
| 7,041,728 B2 | 5/2006 | Zipplies et al. | |
| 7,045,571 B2 | 5/2006 | Tan et al. | |
| 7,045,591 B2 | 5/2006 | Chen et al. | |
| 7,064,170 B2 | 6/2006 | Kaspar et al. | |
| 7,074,862 B2 | 7/2006 | Kaspar et al. | |
| 7,122,608 B1 | 10/2006 | Brinati et al. | |
| 7,125,941 B2 | 10/2006 | Kaulbach et al. | |
| 7,126,016 B2 | 10/2006 | Fu et al. | |
| 7,141,620 B2 | 11/2006 | Hoshikawa et al. | |
| 7,262,246 B2 | 8/2007 | Tan et al. | |
| 7,279,522 B2 | 10/2007 | Dadalas et al. | |
| 7,294,276 B2 | 11/2007 | Malvaski et al. | |
| 7,297,744 B2 | 11/2007 | Kapeliouchko et al. | |
| 7,300,989 B2 | 11/2007 | Buckanin et al. | |
| 7,342,066 B2 | 3/2008 | Dadalas et al. | |
| 7,358,296 B2 | 4/2008 | Bladel et al. | |
| 7,462,667 B2 | 12/2008 | Dadalas | |
| 7,566,762 B2 | 7/2009 | Otsuka | |
| 7,589,234 B2 | 9/2009 | Morita | |
| 7,659,333 B2 | 2/2010 | Hintzer | |
| 7,696,268 B2 | 4/2010 | Tsuda | |
| 7,714,047 B2 | 5/2010 | Tsuda | |
| 7,728,087 B2 | 6/2010 | Hintzer | |
| 7,838,608 B2 | 11/2010 | Hintzer | |
| 8,119,750 B2 | 2/2012 | Hintzer et al. | |
| 2001/0027240 A1 | 10/2001 | Okanishi et al. | |
| 2001/0041740 A1 | 11/2001 | Matsumoto | |
| 2002/0035178 A1* | 3/2002 | Abusleme et al. ............ 524/165 |
| 2002/0040119 A1 | 4/2002 | Tang | |
| 2002/0062161 A1 | 5/2002 | Dusterhoft | |
| 2002/0091212 A1 | 7/2002 | Abusleme et al. | |
| 2002/0114421 A1 | 8/2002 | Erbes et al. | |
| 2002/0123282 A1 | 9/2002 | McCarthy et al. | |
| 2002/0139593 A1 | 10/2002 | Charaudeau et al. | |
| 2002/0193500 A1 | 12/2002 | Hintzer et al. | |

| | | | | | |
|---|---|---|---|---|---|
| 2002/0198345 A1 | 12/2002 | Grootaert et al. | EP | 0752432 | 1/1997 |
| 2003/0018148 A1 | 1/2003 | Kaspar et al. | EP | 0816397 | 1/1998 |
| 2003/0032748 A1 | 2/2003 | Hintzer et al. | EP | 0818506 | 1/1998 |
| 2003/0125421 A1 | 7/2003 | Bladel et al. | EP | 0822226 | 2/1998 |
| 2003/0130393 A1 | 7/2003 | Cavanaugh et al. | EP | 0861856 | 9/1998 |
| 2003/0153674 A1 | 8/2003 | Visca et al. | EP | 0890592 B1 | 1/1999 |
| 2003/0181572 A1 | 9/2003 | Tan et al. | EP | 0894541 | 2/1999 |
| 2003/0220442 A1 | 11/2003 | Epsch et al. | EP | 0964009 | 12/1999 |
| 2004/0010156 A1 | 1/2004 | Kondo et al. | EP | 0969027 | 1/2000 |
| 2004/0016742 A1 | 1/2004 | Miyazaki | EP | 1059333 | 12/2000 |
| 2004/0072977 A1* | 4/2004 | Kaulbach et al. ............ 526/247 | EP | 1059342 | 12/2000 |
| 2004/0087703 A1 | 5/2004 | Kaspar et al. | EP | 1067146 | 1/2001 |
| 2004/0101561 A1 | 5/2004 | Jafari et al. | EP | 1083441 A2 | 3/2001 |
| 2004/0116742 A1 | 6/2004 | Guerra | EP | 1160258 | 12/2001 |
| 2004/0131782 A1 | 7/2004 | Hasei et al. | EP | 1245596 | 10/2002 |
| 2004/0143052 A1 | 7/2004 | Epsch et al. | EP | 1323677 | 7/2003 |
| 2004/0186219 A1 | 9/2004 | Dadalas et al. | EP | 1334996 A3 | 8/2003 |
| 2004/0242755 A1 | 12/2004 | Araki et al. | EP | 1364972 | 11/2003 |
| 2005/0000904 A1 | 1/2005 | Le Bec | EP | 1462461 | 9/2004 |
| 2005/0043471 A1 | 2/2005 | Epsch et al. | EP | 1533325 A1 | 5/2005 |
| 2005/0070633 A1 | 3/2005 | Epsch et al. | EP | 1514848 B1 | 4/2006 |
| 2005/0090601 A1 | 4/2005 | Dadalas et al. | EP | 1676868 | 7/2006 |
| 2005/0090613 A1 | 4/2005 | Maruya et al. | FR | 814839 | 6/1937 |
| 2005/0107506 A1 | 5/2005 | Kapeliouchko et al. | GB | 642025 | 8/1950 |
| 2005/0107518 A1 | 5/2005 | Zipplies | GB | 821353 | 10/1959 |
| 2005/0113507 A1 | 5/2005 | Bladel et al. | GB | 966814 | 8/1964 |
| 2005/0113519 A1 | 5/2005 | Buckanin et al. | GB | 1034926 | 7/1966 |
| 2005/0150833 A1 | 7/2005 | Funaki et al. | GB | 1069364 | 5/1967 |
| 2005/0154104 A1 | 7/2005 | Malvasi et al. | GB | 1073392 | 6/1967 |
| 2005/0177000 A1 | 8/2005 | Fuhrer et al. | GB | 1127521 | 9/1968 |
| 2005/0192397 A1 | 9/2005 | Dadalas et al. | GB | 1281822 | 7/1972 |
| 2005/0228127 A1 | 10/2005 | Tatemoto et al. | GB | 1349764 | 4/1974 |
| 2006/0003168 A1 | 1/2006 | Dadalas et al. | GB | 1473447 | 5/1977 |
| 2006/0014886 A1 | 1/2006 | Hintzer et al. | JP | 46-11031 | 3/1971 |
| 2006/0041051 A1 | 2/2006 | Nakatani et al. | JP | 58-189210 | 11/1983 |
| 2006/0160947 A1 | 7/2006 | Tan et al. | JP | 11349768 | 12/1999 |
| 2006/0270864 A1 | 11/2006 | Sumida et al. | JP | 2000-128934 | 5/2000 |
| 2006/0281946 A1 | 12/2006 | Morita et al. | JP | 2002-308914 | 10/2000 |
| 2007/0004848 A1 | 1/2007 | Hintzer et al. | JP | 2002-179870 | 6/2002 |
| 2007/0015864 A1 | 1/2007 | Hintzer et al. | JP | 2002-220403 | 8/2002 |
| 2007/0015866 A1 | 1/2007 | Hintzer et al. | JP | 2002-317003 | 10/2002 |
| 2007/0015937 A1 | 1/2007 | Hintzer et al. | JP | 2003-500495 | 1/2003 |
| 2007/0025902 A1 | 2/2007 | Hintzer et al. | JP | 2003-043625 | 2/2003 |
| 2007/0082993 A1 | 4/2007 | Amin-Sanayei et al. | JP | 2003-119204 | 4/2003 |
| 2007/0117915 A1 | 5/2007 | Funaki et al. | JP | 2003-212919 | 7/2003 |
| 2007/0135558 A1 | 6/2007 | Tsuda et al. | JP | 2003-284921 | 10/2003 |
| 2007/0149733 A1 | 6/2007 | Otsuka et al. | JP | 2004-358397 | 12/2004 |
| 2007/0155891 A1 | 7/2007 | Tsuda et al. | JP | 2004-359870 | 12/2004 |
| 2007/0276068 A1 | 11/2007 | Hintzer et al. | JP | 2005-008775 | 1/2005 |
| 2007/0276103 A1 | 11/2007 | Guerra et al. | JP | 2005-029527 | 2/2005 |
| 2007/0282055 A1 | 12/2007 | Teter et al. | JP | 2005-036002 | 2/2005 |
| 2008/0015304 A1 | 1/2008 | Hintzer et al. | JP | 2005-105045 | 4/2005 |
| | | | JP | 3758666 | 3/2006 |
| FOREIGN PATENT DOCUMENTS | | | JP | 2006-513303 | 4/2006 |
| CA | 2354138 | 6/2000 | RU | 2158274 C1 | 10/2000 |
| DE | 2000830 | 9/1970 | WO | WO 94/14904 A1 | 7/1994 |
| DE | 3828063 | 2/1990 | WO | WO 96/24622 A1 | 8/1996 |
| DE | 19932771 | 1/2001 | WO | WO 97/17381 A1 | 5/1997 |
| DE | 19933696 | 1/2001 | WO | WO 98/50603 A1 | 11/1998 |
| DE | 10018853 | 10/2001 | WO | WO 99/62830 A1 | 12/1999 |
| EP | 0014431 | 8/1980 | WO | WO 99/62858 A1 | 12/1999 |
| EP | 0 015 592 | 9/1980 | WO | WO 00/22002 A1 | 4/2000 |
| EP | 0015481 | 9/1980 | WO | WO 00/35971 A1 | 6/2000 |
| EP | 0022257 | 1/1981 | WO | WO 00/52060 A1 | 9/2000 |
| EP | 0190393 | 8/1986 | WO | WO 00/71590 A1 | 11/2000 |
| EP | 0219065 | 4/1987 | WO | WO 01/46116 A1 | 6/2001 |
| EP | 0222945 | 5/1987 | WO | WO 01/57096 A1 | 8/2001 |
| EP | 0250767 | 1/1988 | WO | WO 01/79332 A1 | 10/2001 |
| EP | 0253529 | 1/1988 | WO | WO 02/14223 A1 | 2/2002 |
| EP | 0519406 | 12/1992 | WO | WO 02/20676 A1 | 3/2002 |
| EP | 0524585 | 1/1993 | WO | WO 02/44226 A1 | 6/2002 |
| EP | 0525660 | 2/1993 | WO | WO 02/078862 A2 | 10/2002 |
| EP | 0612770 | 8/1994 | WO | WO 02/088203 A2 | 11/2002 |
| EP | 0625526 | 11/1994 | WO | WO 02/088206 A2 | 11/2002 |
| EP | 0632009 | 1/1995 | WO | WO 02/088207 A1 | 11/2002 |
| EP | 0649863 | 4/1995 | WO | WO 02/088248 A1 | 11/2002 |
| EP | 0712882 | 5/1996 | WO | WO 02/095121 A1 | 11/2002 |
| EP | 0718364 | 6/1996 | WO | WO 03/020836 A1 | 3/2003 |
| EP | 0739960 | 10/1996 | WO | WO 03/051988 A2 | 6/2003 |

| | | |
|---|---|---|
| WO | WO 03/087176 A1 | 10/2003 |
| WO | WO 03/087179 A1 | 10/2003 |
| WO | WO 2004/031141 A2 | 4/2004 |
| WO | WO 2004/067588 A1 | 8/2004 |
| WO | WO 2005/003075 A1 | 1/2005 |
| WO | WO 2005/042593 A1 | 5/2005 |
| WO | WO 2005/056614 A1 | 6/2005 |
| WO | WO 2005/063827 A1 | 7/2005 |
| WO | WO 2005/065800 A1 | 7/2005 |
| WO | WO 2005/082785 A1 | 9/2005 |
| WO | WO 2005/121290 A1 | 12/2005 |
| WO | WO 2006/011533 A1 | 2/2006 |
| WO | WO 2006/020721 A1 | 2/2006 |
| WO | WO 2006/135543 A2 | 12/2006 |
| WO | WO 2006/135825 A1 | 12/2006 |
| WO | WO 2007/120348 A1 | 10/2007 |

OTHER PUBLICATIONS

Apostolo et al., "Microemulsion Polymerization for Producing Fluorinated Structured Materials", Macromol. Symp. 2004, 206, pp. 347-360.
"Basic Physical Properties of Chemical Compounds", Knovel Critical Tables 2008, $2^{nd}$ edition.
Candau, "Inverse Emulsion and Microemulsion Polymerization", Emulsion Polymerization and Emulsion Polymers, John Wiley & Sons, 1997, Chapter 21.
Chi et al., "A Facile Synthesis of Partly-fluorinated Ethers Using Perfluroporpoxyethylene and Aliphatic Alcohols", Bull. Korean Chem. Soc., 1999, vol. 20, No. 2, pp. 220-222.
Drobny, Technology of Fluoropolymers, CRC Press LLC, 2001, p. 35.
Ebnesajjad, "Fluoroplastics, vol. 1, Non-Melt Processible Fluoroplastics", Plastics Design Library, NY, 2000, pp. 285-295.
Ebnesajjad, "Fluoroplastics, vol. 2, Melt Processible Fluoropolymers", Plastics Design Library, NY, 2003, pp. 1-21.
Encyclopedia of Polymer Science and Engineering, John Wiley & Sons, vol. 7, 1987, pp. 211-233.
England, "Catalytic Conversion of Fluoroalkyl Alkyl Ethers to Carbonyl Compounds", J. Org. Chem., 1984, vol. 49, pp. 4007-4008.
Furin et al., "Interaction of 1, 1, 2-Trifluoro-2-Hexafluoro-2' (Heptafluoropropoxy)-Propoxyethylene with Alcohols in the presence of bases", Journal of Applied Chemistry, vol. 72, Issue 1, 1999, pp. 125-133.
Furin et al., "Reaction of 1, 1,2-trifluoro-2-hexafluoro-2'-(heptafluoropropoxy)-propoxyethylene with amines or alcohols," Journal of Fluorine Chemistry, vol. 106, Mar. 2000, pp. 13-24.
Griffin, "Calculation of HLB Valves of Non-Ionic Surfactants", Journal of the Society of Cosmetic Chemists, 1954, vol. 5, pp. 249-259.
"Guide to Protein Purification, Methods in Enzymology," Deutscher, M. vol. 182, 24. 1990. (pp. 309-317).
Harrison, D. et al., "Polycyclic Fluoroaromatic Compounds—III: Octafluoroacenaphthylene, and Decafluoro-Indane, -Acenaphthene, -Anthracene, and -Pyrene," Tetrahedron, vol. 19, 1963, pp. 1893-1901.
Hu et al., "High Nucleophilicity of Formate Toward Polyhalofluorocalkenes," Chinese Chem. Letters, vol. 3, No. 2, 1992, pp. 87-92.
"Hydrogen-Ion Activity to Laminated Materials, Glass," Encyclopedia of Chemical Technology. John Wiley & Sons, vol. 13, $3^{rd}$ Ed. 1981. (p. 687).
"Immobilized Biocatalysts to Isoprene," Ullmann's Encyclopedia of Industrial Chemistry. vol. A14. 1985. (p. 439-459).
"Identification to Lignin," Encyclopedia of Polymer Science and Engineering. John Wiley & Sons, vol. 8. 1987 (p. 347).
Ivanova et al., "Synthesis of Alcohols from Perfluorvinyl Esters", Zh. Vses. Khim Obsh 1999, (24), pp. 656-657.
Kokelenberg, "A New Type of Fluortensides, based on the Addition of Nuclephiles to Chlorotrifluorothylene and Hexafluoropropylene," Tenside Detergents, vol. 22, No. 1, 1985, pp. 22-27.
Lampert, D.J. et al., "Removal of Perfluorooctanoic Acid and Perfluorooctane Sulfaonate from Wasterwater by Ion Exchange", Practice of Periodical of Hazardous, Toxic and Radioactive Waste Management, Jan. 2007, vol. 11, No. 1, pp. 60-68.
LaZerte, "The Free-radical Catalyzed Addition of Alcohols and Aldehydes to Perfluoroolefins", Journal Am. Chem. Soc., vol. 77, No. 4, Feb. 20, 1955, pp. 910-917.
Mark et al., Encyclopedia of Polymer Science and Engineering, John Wiley & Sons, 1989, vol. 16, p. 580.
"Nonionic Surfactants." Edited by Martin J. Schick. 1967.
Schiers, "Modern Fluoropolymers: High Performance Polymers for Diverse Applications," John Wiley & Sons, 1997.
Storsberg, Joachim and Ritter, Helmut, "Cyclodextrins in Polymer Synthesis: A 'Green' Route to Fluorinated Polymers via Cyclodextrin Complexes in Aqueous Solution", *Macromol. Chem Phys.*, 2002, pp. 812-818.
Sudol et al., "Miniemulsion Polymerization", Emulsion Polymerization and Emulsion Polymers, John Wiley & Sons, 1997, Chapter. 20.
Sullivan "Synthesis of Perfluoroalkyl Vinyl Ether Acids and Derivatives," Journal of Organic Chemistry, vol. 34, No. 6, Jun. 1969, p. 1841-1844.
Tosler et al., "Ethoxylated Alkyl Amines", Handbook of Detergents, Published by CRC Press, 1999, pp. 26-27.
International Search Report, PCT/US2006/062300, 4 pages, Nov. 6, 2007.
Written Opinion of the International Searching Authority, PCT/US2006/062300, 5 pages, Nov. 6, 2007.
Search Report for International Application No. PCT/US2002/25114, dated Dec. 12, 2002, 3 pages.
International Search Report and Written Opinion PCT/US2008/073251, dated Feb. 24, 2009, 8 pages.

* cited by examiner

AQUEOUS EMULSION POLYMERIZATION PROCESS FOR PRODUCING FLUOROPOLYMERS

CROSS REFERENCE TO RELATED APPLICATIONS

This application is a divisional of U.S. patent application Ser. No. 11/457,239, filed on Jul. 13, 2006 now abandoned, which claims priority from Great Britain Application No. 0525978.3, filed on Dec. 21, 2005; Great Britain Application No. 0523853.0, filed on Nov. 24, 2005; Great Britain Application No. 0514398.7, filed on Jul. 15, 2005; and Great Britain Application No. 0514387.0 filed on Jul. 15, 2005, all of which are herein incorporated by reference in their entirety.

BACKGROUND

Commonly known or commercially employed fluoropolymers include polytetrafluoroethylene (PTFE), copolymers of tetrafluoroethylene (TFE) and hexafluoropropylene (HFP) (FEP polymers), copolymers of TFE and perfluoroalkoxy copolymers (PFA polymers), copolymers of TFE and ethylene (ETFE polymers), terpolymers of TFE, HFP, and vinylidene fluoride (VDF) (THV polymers) and polymers of VDF (PVDF polymers). Commercially employed fluoropolymers also include fluoroelastomers and thermoplastic fluoropolymers. Fluoropolymers and their applications are further described, for instance, in "Modern Fluoropolymers", edited by John Scheirs, John Wiley & Sons Ltd., 1997. The making of such fluoropolymers generally involves the polymerization of gaseous monomers, i.e. monomers that under ambient conditions of temperature and pressure exist as a gas. Several polymerization methods are known to produce fluoropolymers. Such methods include suspension polymerization as described in e.g. U.S. Pat. Nos. 3,855,191, 4,439,385 and EP 649,863; aqueous emulsion polymerization as described in e.g. U.S. Pat. Nos. 3,635,926 and 4,262,101; solution polymerization as described in U.S. Pat. Nos. 3,642, 742, 4,588,796 and 5,663,255; polymerization using supercritical $CO_2$ as described in JP 46011031 and EP 964,009 and polymerization in the gas phase as disclosed in U.S. Pat. No. 4,861,845.

Currently, the most commonly employed polymerization methods include suspension polymerization and aqueous emulsion polymerization. Aqueous emulsion polymerization often involves polymerization in the presence of a fluorinated surfactant, which is generally used to ensure the stabilization of the polymer particles formed. Accordingly, the emulsion polymerization process differs from suspension polymerization in which generally no surfactant is used and which generally results in substantially larger polymer particles than are formed in aqueous emulsion polymerization.

In aqueous emulsion polymerization, the polymerization speed, yield of polymer, comonomer incorporation, particle size and particle number are dependent on each other as well as on the level of emulsifier content. In order to optimize polymer yield, polymerization time and particle size, one can modify the pressure of gaseous monomer(s), the temperature, and the type and amount of fluorinated surfactant. For example, EP 612,770 describes the use of high amounts of fluorinated surfactant to increase the polymerization speed. Increasing the amount of fluorinated surfactant, however, has the disadvantage of increasing the cost of polymerization and may also be environmentally undesirable.

U.S. Pat. No. 4,864,006 describes an aqueous emulsion polymerization process wherein an aqueous micro-emulsion of a perfluoropolyether is added to a polymerization reaction. The micro-emulsion is characterized as a mono-phase solution that is stable in the long run without providing "dispersion energy". It thus seems that the micro-emulsion discussed forms upon simple mixing of the components without the need to apply "dispersion energy" through the use of special emulsifying equipment. Accordingly, the type of surfactants that can be used are limited, as not all surfactants are able to form such a micro-emulsion. The limitations on the useful surfactants may further complicate the polymerization process. For example, as shown in the examples of U.S. Pat. No. 4,864,006, the micro-emulsion of the perfluoropolyether is formed using a perfluoropolyether that has a carboxylic acid group as a surfactant. Such surfactants may be expensive. Further, as shown in the examples of U.S. Pat. No. 4,864,006, the micro-emulsion forms at elevated temperatures.

EP 969,027 describes a process for making PTFE dispersions. In this patent application, a micro-emulsion of a perfluoropolyether obtained through emulsification with a perfluoropolyether surfactant is used to prepare the PTFE dispersion. Although small polymer particles are achieved in this process, it appears that large amounts of surfactant are used. The use of large amounts of surfactants is disadvantageous in that it makes the process more costly and may put environmental burdens on the process.

U.S. Pat. No. 5,895,799 describes a micro-emulsion polymerization of TFE to produce very small particle dispersions of PTFE in water. The polymerization of TFE itself proceeds in a micro-emulsion of liquid perfluorinated hydrocarbons. This micro-emulsion is formed by adding the perfluorinated hydrocarbon liquid and a fluorinated surfactant to water at a temperature and in proportions that result in a micro-emulsion. As is well known, micro-emulsions only form when the surfactant is used above its critical micelle concentration (CMC). See P. Lovell, "Emulsion Polymerization and Emulsion Polymers", J. Wiley, 1997, pages 700-739. As a result, the process taught in U.S. Pat. No. 5,895,799 will generally require large amounts of surfactant, typically much higher than the amounts employed in conventional aqueous emulsion polymerization processes that use surfactants in amounts below the CMC.

SUMMARY

The present invention recognizes that it is now desirable to improve the aqueous emulsion polymerization of fluorinated monomers to produce fluoropolymers. It is in particular desirable to reduce the polymerization time, improve the yield of polymer solids obtained and/or to obtain fluoropolymer dispersions having a small particle size. It is further desirable to simultaneously use a surfactant that has a low toxicity and/or shows little or no bioaccumulation. Further, the surfactant should have good chemical and thermal stability enabling polymerization over a wide range of conditions of temperature and pressure.

In one aspect of the present invention, there is provided a method of making a fluoropolymer comprising polymerizing one or more fluorinated monomers in an aqueous emulsion polymerization in the presence of a fluorinated surfactant selected from fluorinated surfactants of formula (I):

wherein $R_f$ is selected from a partially fluorinated alkyl group, a fully fluorinated alkyl group, a partially fluorinated alkyl group that is interrupted with one or more oxygen atoms, and a fully fluorinated alkyl group that is interrupted with one or more oxygen atoms; L is selected from a partially fluorinated alkylene group, a fully fluorinated alkylene group, a partially fluorinated alkylene group that is interrupted with one or more oxygen atoms, and a fully fluorinated alkylene group that is interrupted with one or more oxygen atoms; $X^{i+}$ represents a cation having the valence i; and i is 1, 2, or 3; further wherein at least part of the fluorinated surfactant is added to the aqueous phase as an aqueous mixture with at least one fluorinated liquid, and further wherein when the fluorinated surfactant is a perfluorinated polyethercarboxylic acid, the fluorinated liquid is not a perfluoropolyether.

In a further aspect of the present invention, there is provided a method of making a fluoropolymer comprising polymerizing one or more fluorinated monomers in an aqueous emulsion polymerization to give an aqueous dispersion, wherein polymerizing is in the presence of a fluorinated surfactant selected from:

i) fluorinated surfactants of formula (II):

$$CF_3\text{---}(OCF_2)_m\text{---}O\text{---}CF_2\text{---}X \qquad (II)$$

wherein m has a value of from 1 to 6 and X represents a carboxylic acid or salt thereof;

ii) fluorinated surfactants of formula (III):

$$CF_3\text{---}O\text{---}(CF2)_3\text{-}(OCF(CF_3)CF_2)_z\text{---}O\text{-}L\text{-}Y \qquad (III)$$

wherein z has a value of 0, 1, 2, or 3; L represents a divalent linking group selected from —CF(CF$_3$)—, —CF$_2$—, and —CF$_2$CF$_2$—, and Y represents a carboxylic acid group or salt thereof;

iii) fluorinated surfactants of formula (IV):

$$[R_f^1\text{---}(O)_t\text{---}CQH\text{---}(CF_2)_p\text{---}O]_n\text{---}R\text{-}G \qquad (IV)$$

wherein $R_f^1$ represents a partially or fully fluorinated aliphatic group optionally interrupted with one or more oxygen atoms, Q represents F or CF$_3$, R is an aliphatic or aromatic hydrocarbon group, G represents a carboxylic or sulfonic acid or salt thereof, t is 0 or 1, and n is 1, 2, or 3;

iv) fluorinated surfactants of formula (V)

$$R_f^2\text{---}(O)_s\text{---}CHF\text{---}(CF_2)_v\text{---}X \qquad (V)$$

wherein $R_f^2$ represents a partially or fully fluorinated aliphatic group optionally interrupted with one or more oxygen atoms, s is 0 or 1, v is 0 or 1, and X is a carboxylic acid or salt thereof;

v) fluorinated surfactants of formula (VI)

$$R_f^3\text{---}O\text{---}CF_2CF_2\text{---}X \qquad (VI)$$

wherein $R_f^3$ represents a linear or branched perfluoroalkyl group having 1, 2, 3, or 4 carbon atoms and X represents a carboxylic acid group or salt thereof; further wherein at least part of the fluorinated surfactant is added to the aqueous phase as an aqueous mixture with at least one fluorinated liquid, the aqueous mixture comprising droplets having an average droplet diameter of not more than 2000 nm.

At least part of the fluorinated surfactant is added to the aqueous phase as an aqueous mixture with at least one fluorinated liquid. The fluorinated liquid may be polymerizable or non-polymerizable.

In a further aspect, the present invention relates to an aqueous mixture comprising a fluorinated surfactant selected from:

i) fluorinated surfactants of formula (II):

$$CF_3\text{---}(OCF_2)_m\text{---}O\text{---}CF_2\text{---}X \qquad (II)$$

wherein m has a value of from 1 to 6 and X represents a carboxylic acid or salt thereof;

ii) fluorinated surfactants of formula (III):

$$CF_3\text{---}O\text{---}(CF2)_3\text{-}(OCF(CF_3)CF_2)_z\text{---}O\text{-}L\text{-}Y \qquad (III)$$

wherein z has a value of 0, 1, 2, or 3; L represents a divalent linking group selected from —CF(CF$_3$)—, —CF$_2$—, and —CF$_2$CF$_2$—, and Y represents a carboxylic acid group or salt thereof;

iii) fluorinated surfactants of formula (IV):

$$[R_f^1\text{---}(O)_t\text{---}CQH\text{---}(CF_2)_p\text{---}O]_n\text{---}R\text{-}G \qquad (IV)$$

wherein $R_f^1$ represents a partially or fully fluorinated aliphatic group optionally interrupted with one or more oxygen atoms, Q represents F or CF$_3$, R is an aliphatic or aromatic hydrocarbon group, G represents a carboxylic or sulfonic acid or salt thereof, t is 0 or 1, and n is 1, 2, or 3;

iv) fluorinated surfactants of formula (V)

$$R_f^2\text{---}(O)_s\text{---}CHF\text{---}(CF_2)_v\text{---}X \qquad (V)$$

wherein $R_f^2$ represents a partially or fully fluorinated aliphatic group optionally interrupted with one or more oxygen atoms, s is 0 or 1, v is 0 or 1, and X is a carboxylic acid or salt thereof;

v) fluorinated surfactants of formula (VI)

$$R_f^3\text{---}O\text{---}CF_2CF_2\text{---}X \qquad (VI)$$

wherein $R_f^3$ represents a linear or branched perfluoroalkyl group having 1, 2, 3, or 4 carbon atoms and X represents a carboxylic acid group or salt thereof; the aqueous mixture further comprising at least one fluorinated liquid and, wherein the surfactant and the fluorinated liquid form emulsified droplets, further wherein the droplets have an average droplet diameter of from 20 nm to 2000 nm.

In a further aspect, the present invention relates to an aqueous mixture comprising a fluorinated surfactant selected from fluorinated surfactants of formula (I):

$$[R_fO\text{-}L\text{-}CO_2^-]_iX^{i+} \qquad (I)$$

wherein $R_f$ is selected from a partially fluorinated alkyl group, a fully fluorinated alkyl group, a partially fluorinated alkyl group that is interrupted with one or more oxygen atoms, and a fully fluorinated alkyl group that is interrupted with one or more oxygen atoms; L is selected from a partially fluorinated alkylene group, a fully fluorinated alkylene group, a partially fluorinated alkylene group that is interrupted with one or more oxygen atoms, and a fully fluorinated alkylene group that is interrupted with one or more oxygen atoms; $X^{i+}$ represents a cation having the valence i; and i is 1, 2, or 3; further comprising at least one fluorinated liquid, and further wherein when the fluorinated surfactant is a perfluorinated polyethercarboxylic acid, the fluorinated liquid is not a perfluoropolyether.

By the term "liquid" or "fluid" in connection with the present invention are included compounds that are liquid at a temperature of 20° C. and a pressure of 1 atm as well as compounds that are liquid under the polymerization conditions.

By the term "not miscible with water" is meant a liquid that forms a separate phase absent surfactant when mixed with water in the amounts in which liquid is employed in the polymerization described.

By the term "non-polymerizable" is meant a compound that, even though present in a reaction medium, is not incorporated into a polymer formed in an amount that can be measured. For instance, a compound that has no olefinic groups may be non-polymerizable in the presence of a radical polymerization. Some compounds having olefinic groups may also be non-polymerizable when in the presence of a radical polymerization of tetrafluoroethylene, despite the presence of a double bond. For instance, compounds containing double bonds that are sterically hindered, such as 1,2-

(perfluoro-n-butyl)ethylene are known to be non-polymerizable. See, U.S. Pat. No. 5,182,342.

In the present application, when the term is used "interrupted with one or more oxygen atoms", it is meant that one or more ether groups may be present in the aliphatic group. That is, for instance, where two oxygen atoms are present, they are separated by at least one carbon atom, so as to form a di-ether. Peroxide structures are not contemplated by the term "interrupted by one or more oxygen atoms".

DETAILED DESCRIPTION

For the sake of convenience, the term "fluorinated carboxylic acid" is hereinafter used to indicate a free acid as well as salts thereof.

The advantages of the process of the present invention are conveniently achieved by adding to the aqueous phase of an emulsion polymerization system at least part of the fluorinated surfactant selected from formula (I) as an aqueous mixture with a fluorinated liquid. It has been found that the fluorinated surfactants of formula (I) eliminate more quickly from a living organism, as demonstrated by rat screening studies, than perfluoro alkanoic acids having 8 or more carbon atoms. Additionally, it has been found that these surfactants can be used in the emulsion polymerization of fluorinated monomers to produce fluoropolymer dispersions, wherein the surfactants can be recovered from the dispersions in an easy and convenient way.

Because of their lower bio-accumulation, the fluorinated surfactants, salts, and derivatives thereof (such as ester derivatives) should provide less of an environmental burden where 100% recovery of these surfactants from the dispersions is not achieved. Further, the process of reducing the amount of these surfactants in the dispersions should be more beneficial for operators of the removal processes, wherein the operators may be exposed, for example accidentally, to fluorinated carboxylic acids, their salts, or derivatives used in work-up procedures following the recovery of surfactants from the fluoropolymer dispersions.

In particular embodiments, fluorinated surfactants that contain no branched alkyl groups and no branched alkylene groups exhibit a more favorable bio-accumulation profile. That is, linear fluorinated surfactants tend to show a shorter renal elimination half-life and a higher rate of recovery than the corresponding branched fluorinated surfactants.

In some embodiments, the fluorinated surfactants are those that when administered to rats show a recovery of at least 45%, for example at least 50% of the administered amount after 96 hours via renal elimination and that have a renal elimination half-life of not more than 35 hours, for example of not more than 30 hours in rats as tested according to the method set forth in the examples. Generally, fluorinated surfactants in which each of the fluorinated aliphatic moieties in the compound have not more than 3 carbon atoms fulfill the aforementioned conditions of renal recovery and half-life. Thus, some embodiments include those fluorinated surfactants in which any fluorinated alkylene groups have not more than 3 carbon atoms and in which a fluorinated alkyl group of the compound has not more than 3 carbon atoms.

Generally, the fluorinated surfactant will be a low molecular weight compound, for example a compound having a molecular weight for the anion part of the compound of not more than 1000 g/mol, typically not more than 600 g/mol and in particular embodiments, the anion of the fluorinated surfactant (that is, the anion of the carboxylic acid) may have a molecular weight of not more than 500 g/mol.

In the above formula (I), L represents a linking group. The linking group may be an alkylene group, and can be a linear or branched and may be partially or fully fluorinated. Fully fluorinated alkylene groups include alkylene groups that consist of only carbon and fluorine atoms whereas partially fluorinated alkylene groups may additionally contain hydrogen. Generally, a partially fluorinated alkylene group should not contain more than 2 hydrogen atoms so as to be highly fluorinated and be non-telogenic or at least have minimal telogenic effects. Examples of fully fluorinated alkylene groups include linear perfluorinated alkylenes that have from 1 to 6 carbon atoms, for example linear perfluorinated alkylene groups of 1, 2, 3, 4 or 5 carbon atoms.

Examples of linear partially fluorinated alkylene groups include those that have from 1 to 6 carbon atoms. In a particular embodiment the linear partially fluorinated alkylene linking group has 1, 2, 3, 4, 5 or 6 carbon atoms and has only 1 or 2 hydrogen atoms. When the partially fluorinated alkylene group has 2 hydrogen atoms, the hydrogen atoms may be attached to the same carbon atom or they can be attached to different carbon atoms. When they are attached to different carbon atoms, such carbon atoms can be adjacent to each other or not. Also, in a particular embodiment, a carbon atom having 1 or 2 hydrogen atoms may be adjacent the ether oxygen atom to which the linking group is attached or adjacent the carboxylic group to which the linking group is attached at its other end.

Particular examples of linking groups L may be selected from the following:
—$(CF_2)_g$— wherein g is 1, 2, 3, 4, 5 or 6;
—CFH—$(CF_2)_h$— wherein h is 0, 1, 2, 3, 4 or 5;
—$CF_2$—CFH—$(CF_2)_d$— wherein d is 0, 1, 2, 3 or 4;
—$CH_2$—$(CF_2)_h$— wherein h is 1, 2, 3 or 4;
—$(CH_2)_c$— wherein c is 1, 2, 3 or 4;
In the above examples, the left side of the formula of the linking group is the site where the linking group is connected to an ether oxygen in formula (I).

The $R_f$ group in formula (I) represents a partially fluorinated alkyl group, a fully fluorinated alkyl group, a partially fluorinated alkyl group that is interrupted with one or more oxygen atoms, and a fully fluorinated alkyl group that is interrupted with one or more oxygen atoms.

In one embodiment, $R_f$ is a linear perfluorinated aliphatic group having 1 to 6 carbon atoms, preferably having 1, 2, 3 or 4 carbon atoms. According to another embodiment $R_f$ is a linear perfluorinated aliphatic group interrupted with one or more oxygen atoms of which the alkylene groups between oxygen atoms have not more than 4 or 6 carbon atoms, for example 3 or less carbon atoms and wherein the terminal alkyl group has not more than 4 or 6 carbon atoms, for example 3 or less carbon atoms.

According to a still further embodiment, $R_f$ is a linear partially fluorinated aliphatic group having 1 to 6 carbon atoms and not more than 2 hydrogen atoms or a linear partially fluorinated aliphatic group interrupted with one or more oxygen atoms and which has not more than 2 hydrogen atoms. In the latter embodiment, it will generally be preferred that any perfluorinated alkylene moiety has not more than 4 or 6 carbon atoms and any terminal perfluorinated alkyl group, likewise preferably should not have more than 6 carbon atoms, for example not more than 4 carbon atoms. A particular example of a partially fluorinated aliphatic group $R_f$ is $CF_3$CFH—.

Specific examples of compounds according to formula (I) include the following:
$R_f$—O—CHF—COOH
$C_3F_7$—O—CHF—COOH CF$_3$—O—CF$_2$CF$_2$—CF$_2$—O—CHF—COOH
CF$_3$CF$_2$CF$_2$—O—CF$_2$CF$_2$—CF$_2$—O—CHF—COOH
CF$_3$—O—CF$_2$—CF$_2$—O—CHF—COOH
CF$_3$—O—CF$_2$—O—CF$_2$—CF$_2$—O—CHF—COOH
CF$_3$—(OCF$_2$)$_2$—O—CF$_2$—CF$_2$—O—CHF—COOH
CF$_3$—(OCF$_2$)$_3$—O—CF$_2$—CF$_2$—O—CHF—COOH
R$_f$—O—CHF—CF$_2$—COOH
CF$_3$—O—CHF—CF$_2$—COOH
CF$_3$—O—CF$_2$CF$_2$—O—CHF—CF$_2$—COOH
CF$_3$—CF$_2$—O—CHF—CF$_2$—COOH
CF$_3$—O—CF$_2$CF$_2$—CF$_2$—O—CHF—CF$_2$—COOH
CF$_3$—O—CF$_2$—O—CF$_2$CF$_2$—O—CHF—CF$_2$—COOH
CF$_3$—(OCF$_2$)$_2$—O—CF$_2$CF$_2$—O—CHF—CF$_2$—COOH
CF$_3$—(OCF$_2$)$_3$—O—CF$_2$CF$_2$—O—CHF—CF$_2$—COOH
R$_f$—O—CF$_2$—CHFCOOH
CF$_3$—O—CF$_2$—CHF—COOH
C$_3$F$_7$—O—CF$_2$—CHF—COOH
CF$_3$—O—CF$_2$CF$_2$CF$_2$—O—CF$_2$—CHF—COOH
CF$_3$—O—CF$_2$—O—CF$_2$CF$_2$—O—CF$_2$—CHF—COOH
CF$_3$—(OCF$_2$)$_2$—O—CF$_2$CF$_2$—O—CF$_2$—CHF—COOH
CF$_3$—(OCF$_2$)$_3$—O—CF$_2$CF$_2$—O—CF$_2$—CHF—COOH
R$_f$—O—CF$_2$—CHF—CF$_2$COOH
CF$_3$—O—CF$_2$—CHF—CF$_2$—COOH
C$_2$F$_5$—O—CF$_2$—CHF—CF$_2$—COOH
C$_3$F$_7$—O—CF$_2$—CHF—CF$_2$—COOH
CF$_3$—O—CF$_2$CF$_2$CF$_2$—O—CF$_2$—CHF—CF$_2$—COOH
CF$_3$—O—CF$_2$—O—CF$_2$CF$_2$—O—CF$_2$—CHF—CF$_2$—COOH
CF$_3$—(OCF$_2$)$_2$—O—CF$_2$CF$_2$—O—CF$_2$—CHF—CF$_2$—COOH
CF$_3$—(OCF$_2$)$_3$—O—CF$_2$CF$_2$—O—CF$_2$—CHF—CF$_2$—COOH
R$_f$—(O)$_m$—CHF—CF$_2$—O—(CH$_2$)$_n$—COOH n=1, 2 or 3; m=0 or 1
CF$_3$—O—CHF—CF$_2$—O—CH$_2$—COOH
CF$_3$—O—CF$_2$CF$_2$CF$_2$—O—CHF—CF$_2$—O—CH$_2$—COOH
C$_3$F$_7$—O—CHF—CF$_2$—O—CH$_2$—COOH
C$_3$F$_7$—O—CHF—CF$_2$—O—CH$_2$CH$_2$—COOH
C$_3$F$_7$—O—CF$_2$CF$_2$—O—CHF—CF$_2$—OCH$_2$—COOH
C$_3$F$_7$—O—CF$_2$—CF$_2$—CF$_2$—O—CHF—CF$_2$—OCH$_2$—COOH
C$_3$F$_7$—O—CF$_2$—CHF—CF$_2$—OCH$_2$—COOH
CF$_3$—CHF—CF$_2$—O—CH$_2$—COOH
C$_3$F$_7$—CF$_2$—CHF—CF$_2$—OCH$_2$—COOH
R$_f$—O—((CF$_2$)$_n$—O)$_m$—CH$_2$—COOH n=1, 2, or 3; m=0, 1, 2
CF$_3$—O—CF$_2$CF$_2$—O—CH$_2$—COOH
CF$_3$—O—CF$_2$CF$_2$CF$_2$—O—CF$_2$CF$_2$—O—CH$_2$—COOH
C$_3$F$_7$—O—CF$_2$CF$_2$—O—CH$_2$—COOH
C$_3$F$_7$—O—CF$_2$CF$_2$—O—CF$_2$CF$_2$—OCH$_2$—COOH
C$_3$F$_7$—O—CF$_2$CF$_2$CF$_2$—O—CF$_2$CF$_2$—OCH$_2$—COOH
C$_3$F$_7$—O—CF$_2$CF$_2$CF$_2$—OCH$_2$—COOH
C$_4$F$_9$—O—CH$_2$—COOH
C$_3$F$_7$—O—CH$_2$—COOH
C$_6$F$_{13}$—OCH$_2$—COOH
R$_f$—O—CF$_2$CF$_2$—COOH
CF$_3$—O—CF$_2$CF$_2$—COOH
C$_2$F$_5$—O—CF$_2$CF$_2$—COOH
C$_3$F$_7$—O—CF$_2$CF$_2$—COOH
C$_4$F$_9$—O—CF$_2$CF$_2$—COOH
R$_f$—(OCF$_2$)$_u$—O—CF$_2$—COOH where u is 1, 2, or 3
CF$_3$—(OCF$_2$)$_3$—O—CF$_2$—COOH
CF$_3$—(OCF$_2$)$_2$—O—CF$_2$—COOH
CF$_3$—(OCF$_2$)—O—CF$_2$—COOH
R$_f$—(OCF$_2$CF$_2$)$_k$—O—CF$_2$—COOH with k being 1, 2 or 3
CF$_3$—(OCF$_2$CF$_2$)$_1$—O—CF$_2$—COOH
C$_2$F$_5$—(OCF$_2$CF$_2$)$_1$—O—CF$_2$—COOH
C$_3$F$_7$—(OCF$_2$CF$_2$)$_1$—O—CF$_2$—COOH
C$_4$F$_9$—(OCF$_2$CF$_2$)$_1$—O—CF$_2$—COOH
C$_2$F$_5$—(OCF$_2$CF$_2$)$_2$—O—CF$_2$—COOH
CF$_3$—(OCF$_2$CF$_2$)$_2$—O—CF$_2$—COOH
C$_3$F$_7$—(OCF$_2$CF$_2$)$_2$—O—CF$_2$—COOH
C$_4$F$_9$—(OCF$_2$CF$_2$)$_2$—O—CF$_2$—COOH
R$_f$—O—CF$_2$—COOH
C$_3$F$_7$—O—CF$_2$—COOH
CF$_3$—O—CF$_2$CF$_2$CF$_2$—O—CF$_2$—COOH
CF$_3$CHF—O—(CF$_2$)$_o$—COOH with o being an integer of 1, 2, 3, 4, 5 or 6
CF$_3$ CFH—O—(CF$_2$)$_3$—COOH
CF$_3$ CFH—O—(CF$_2$)$_5$—COOH
CF$_3$CF$_2$—O—(CF$_2$)$_o$—COOH with o being as above
CF$_3$ CF$_2$—O—(CF$_2$)$_3$—COOH
CF$_3$ CF$_2$—O—(CF$_2$)$_5$—COOH Surfactants of formula (II) are commercially available from Anles Ltd., St. Petersburg, Russia. These compounds may be prepared, for example, as described by Ershov and Popova in Fluorine Notes 4(11), 2002. Also, these perfluoropolyethers typically form as byproducts in the manufacturing of hexafluoropropylene oxide by direct oxidation of hexafluoropropylene.

Surfactants according to formula (III) can be derived from reactants that are also used in the manufacturing of fluorinated vinyl ethers as described in U.S. Pat. No. 6,255,536. Accordingly, these perfluoropolyethers can be obtained in an economically attractive way as they can be derived from other starting materials that may be used as needed in the manufacturing of fluoromonomers and fluoropolymers.

Examples of compounds according to formula (II) or formula (III) include:
CF$_3$—(OCF$_2$)$_3$—O—CF$_2$COOH
CF$_3$—(OCF$_2$)$_2$—O—CF$_2$COOH
CF$_3$—(OCF$_2$)—O—CF$_2$COOH
CF$_3$—O—C$_3$F$_6$—O—CF$_2$COOH
CF$_3$—O—C$_3$F$_6$—O—CF(CF$_3$)COOH The surfactants of formula (IV) can be prepared by a number of routes including, for instance, reacting, generally in the presence of a base, (a) a fluorinated olefin of the general formula:

$$R_f^1—(O)_t—CF=CF_2$$

wherein $R_f^1$ and t are as defined above with (b) an organic compound of the formula:

$$(HO)_n—R\text{-}G$$

wherein n is 1, 2 or 3, G and R are as defined above.

Other synthetic routes include those discussed, for instance, in co-pending application GB 0523853.0 of Koenigsmann et al.

Specific examples of surfactants according to formula (IV) include:
C$_3$F$_7$—O—CHF—CF$_2$—OC$_6$H$_4$COO$^-$Li$^+$
C$_3$F$_7$—O—CF$_2$—CF$_2$—O—CHF—CF$_2$—OC$_6$H$_4$COO$^-$Na$^+$
C$_3$F$_7$—O—CF$_2$—CF$_2$—CF$_2$—O—CHF—CF$_2$—OC$_6$H$_4$COOH
C$_3$F$_7$—O—CF$_2$—CHF—CF$_2$—OC$_6$H$_4$COO$^-$NH$_4^+$
C$_3$F$_7$—CF$_2$—CHF—CF$_2$—OC$_6$H$_4$COO$^-$NH$_4^+$
C$_3$F$_7$—O—CHF—CF$_2$—OCH$_2$COO$^-$Li$^+$
C$_3$F$_7$—O—CF$_2$—CF$_2$—O—CHF—CF$_2$—OCH$_2$COO$^-$Na$^+$
C$_3$F$_7$—O—CF$_2$—CF$_2$—CF$_2$—O—CHF—CF$_2$—OCH$_2$COOH
C$_3$F$_7$—O—CF$_2$—CHF—CF$_2$—OCH$_2$COO$^-$NH$_4^+$ $C_3F_7$—$CF_2$—CHF—$CF_2$—$OCH_2COO^-NH_4^+$
$CF_3$—$CH(CF_3)$—$CF_2$—O—$CH_2$—COOH
$C_3F_7$—O—$C(CF_3)F$—$CF_2$—O—CFH—$CF_2$—O—$CH_2$—COOH
$CF_3$—CFH—$CF_2$—O—$C_6H_4$—COOH Fluorinated surfactants of formula (V) can be derived from a fluorinated olefin of formula (VII).

$$R_f^2\text{—}(O)_s\text{—}CF\text{=}CF_2 \qquad (VII)$$

Fluorinated olefins according to formula (VII) that can be used to prepare the fluorinated surfactants of formula (V) include perfluorinated alkyl vinyl compounds, vinyl ethers in particular perfluorovinyl ethers and allyl ethers, in particular perfluorinated allyl ethers. Particular examples of fluorinated olefins include those that are used in the preparation of fluoropolymers and that are described below.

According to one embodiment, surfactants according to formula (V) wherein n is 0 can be prepared by reacting a fluorinated olefin of formula (VII) with a base. The reaction is generally carried out in aqueous media. An organic solvent may be added to improve the solubility of the fluorinated olefin. Examples of organic solvents include glyme, tetrahydrofuran (THF) and acetonitrile. Additionally or alternatively a phase transfer catalyst may be used. As a base, use can be made of for example ammonia, alkali and earth alkali hydroxides. Without intending to be bound by any theory, it is believed, that the reaction proceeds according to the following sequence when ammonia is used as a base:

$$R_f^2\text{—}(O)_s\text{—}CF\text{=}CF_2 + NH_3 + H_2O \rightarrow R_f^2\text{—}(O)_s\text{—}CHF\text{—}COONH_4 + NH_4F$$

The reaction is generally carried out between 0 and 200° C., for example between 20 150° C. and at a pressure between about 1 bar up to about 20 bar. For further purification, the obtained salts can be distilled via the free acid or by first converting the acid into an ester derivative and then distilling the ester derivative followed by hydrolysis of the ester to obtain the purified acid or salt thereof.

In an alternative embodiment to prepare the fluorinated surfactants of formula (V) wherein n is 0 can be prepared by reacting a fluorinated olefin of formula (VII) with a hydrocarbon alcohol in an alkaline medium and then decomposing the resulting ether in acidic conditions thereby forming the corresponding carboxylic acid. Suitable hydrocarbon alcohols include aliphatic alcohols such as those having 1 to 4 carbon atoms. Specific examples include methanol, ethanol and butanol including t-butanol. The reaction of the fluorinated olefin with the alcohol in an alkaline medium may be carried out as described in Furin et al., Bull Korean Chem. Soc. (20), 220 (1999). The reaction product of this reaction is an ether derivative of the fluorinated olefin. This resulting ether can be decomposed under acidic conditions as described in D. C. England, J. Org. Chem. (49), 4007 (1984) to yield the corresponding carboxylic acid or salt thereof.

To prepare fluorinated surfactants of formula (V) wherein n is 1, a free radical reaction of the fluorinated olefin of formula (VII) with a hydrocarbon alcohol may be carried out followed by an oxidation of the resulting reaction product. Suitable hydrocarbon alcohols that can be used include aliphatic alcohols such as lower alkanols having 1 to 4 carbon atoms. Specific examples include methanol, ethanol and propanol. The free radical reaction is typically carried out using a free radical initiator as is typically used in a free radical polymerization reaction. Examples of suitable free radical initiators include persulfates such as for example ammonium persulfate. Detailed conditions of the free radical reaction of the fluorinated surfactant with an alcohol can be found in S. V. Sokolov et al., Zh. Vses. Khim Obsh (24), 656 (1979). The resulting alcohol derivative of the fluorinated olefin can be chemically oxidized with an oxidizing agent to the corresponding carboxylic acid. Examples of oxidizing agents include for example potassium permanganate, chromium (VII) oxide, $RuO_4$ or $OsO_4$ optionally in the presence of NaOCl, nitric acid/iron catalyst, dinitrogen tetroxide. Typically the oxidation is carried out in acidic or basic conditions at a temperature between 10 and 100° C. In addition to chemical oxidation, electrochemical oxidation may be used as well.

Specific examples of fluorinated surfactants according to formula (V) include:

$CF_3$—O—$CF(CF_3)$—$CF_2$—O—CHF—COOH
$C_3F_7$—O—CHF—COOH
$C_3F_7$—O—$CF(CF_3)$—$CF_2$—O—CHF—COOH
$CF_3$—O—$CF_2CF_2$—$CF_2$—O—CHF—COOH
$CF_3$—O—$CF_2$—$CF_2$—O—CHF—COOH
$CF_3$—O—CHF—$CF_2$—COOH
$CF_3$—O—$CF_2$—$CF_2$—O—CHF—$CF_2$—COOH
$CF_3$—$CF_2$—CHF—$CF_2$—COOH
$CF_3$—O—$CF_2$—$CF_2$—$CF_2$—O—$CF_2$—CHF—COOH
$CF_3$—O—$CF_2$—$CF_2$—$CF_2$—O—$CF_2$—CHF—$CF_2$—COOH

The surfactants according to formula (VI) can be synthesized starting from the corresponding perfluorinated acid fluorides, the preparation of which is described e.g. in WO 01/46116. To prepare a surfactant of formula (VI) in which X is a carboxylic acid, the corresponding perfluorinated acid fluorides are hydrolyzed with water. Conversion of the acid to any salt may be accomplished by neutralization with an appropriate base. Alternatively, the perfluorinated acid fluoride may be reacted with an alcohol (e.g. methanol or ethanol) so as to result in the corresponding ester. This ester can then be distilled for further purification and finally be saponified to the desired salt.

Specific examples of surfactants according to formula (VI) include:

$CF_3$—O—$CF_2CF_2$—COOM
$CF_3CF_2$—O—$CF_2CF_2$COOM
$CF_3CF_2CF_2$—O—$CF_2CF_2$COOM
$(CF_3)_2CF$—O—$CF_2CF_2$COOM
$(CF_3)_3C$—O—$CF_2CF_2$COOM
$CF_3$-$(CF_2)_3$—O—$CF_2CF_2$—COOM wherein M represents H, Na, K or $NH_4$.

It is understood that while the description of compounds in the present application may reference only the acid form or only the salt form of a certain species, the corresponding acids and salts, in particular the $NH_4^+$, potassium, sodium or lithium salts, can equally be used.

The fluorinated liquid may, for instance, be selected from aliphatic and aromatic fluorinated liquids that optionally have oxygen, sulfur and/or nitrogen atoms. In particular, some embodiments have up to 2 oxygen, sulfur and/or nitrogen atoms.

The fluorinated liquid typically will have a boiling point of at least 30° C., at least 100° C., or even at least 150° C., for example between 150° C. and 230° C. Fluorinated liquids with boiling points above 230° C. are also contemplated. For instance, fluorinated liquids may have boiling points up to 250° C., up to 300° C., even up to 350° C.

In a particular embodiment the fluorinated liquid is capable of participating in the free radical polymerization reaction such that the fluorinated liquid is incorporated into the fluoropolymer structure produced. That is, in some embodiments, the fluorinated liquid is polymerizable. A polymerizable fluorinated liquid may, in some embodiments, have the advantage that little if any residual of the fluorinated liquid will remain in the aqueous dispersion. Examples of fluorinated liquids capable of participating in the polymerization (i.e., polymerizable) include, in particular, liquid monomers such as, for instance, liquid fluorinated monomers. Examples of liquid fluorinated monomers that can be used include liquid perfluorovinyl ethers such as perfluoro-2-propoxypropylvinyl ether, perfluoro-3-methoxy-n-propylvinyl ether and $CF_3$—$(CF_2)_2$—O—$CF(CF_3)$—$CF_2$—O—$CF(CF_3)$—$CF_2$—O—$CF$=$CF_2$ (PPVE-3).

Suitable fluorinated liquids include those selected from perfluoroalkanes and $(R_f')_3N$, wherein each $R_f'$ is independently selected from a fluorinated alkyl group having from 1 to 10 carbon atoms.

In other embodiments, the fluorinated liquid may be selected from perfluoropolyethers of formula (VIII):

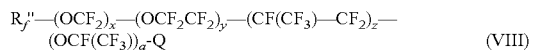

(VIII)

In formula (VIII), $R_f''$ is selected from perfluoroalkyl groups having from 1 to 10 carbon atoms; Q is selected from $R_f''$ and $R_f''$ —$(OCF_2)_x$—$(OCF_2CF_2)_y$—$(CF(CF_3)$—$CF_2)_z$—$(OCF(CF_3))_a$; each x, y, z, and a is independently selected from 0 to 10, with the proviso that the sum of x+y+z+a is at least 1.

In yet further embodiments, the fluorinated liquid may be a partially fluorinated liquid. It is preferred, however, that a partially fluorinated liquid does not act as a chain transfer agent in the aqueous phase. Chain transfer agents are non-radical species that react with a radical species. This may involve, for instance, a chain transfer agent reacting with an actively polymerizing chain. The result of this reaction is at least one different radical species. After this happens, the polymerizing chain is terminated. A new chain may or may not start, depending on the reactivity of the new radical species. In many cases, the result is a diminution of the molecular weight of the resulting polymer compared with a polymer prepared under the same conditions except that the chain transfer agent is not present. This diminution of molecular weight often takes place without a change in the overall rate of conversion of monomer to polymer. Therefore, it is possible to determine whether a fluorinated liquid is acting as a chain transfer agent in the aqueous phase by observing the molecular weight of the resulting polymer with and without the fluorinated liquid. If the molecular weight is significantly decreased with the addition of the fluorinated liquid (e.g., by 10% or more, by 20% or more, or even by 30% or more), then the fluorinated liquid is acting as a chain transfer agent in the aqueous phase.

Particular embodiments of partially fluorinated liquids include those selected from fluorinated polyethers of the formula (IX):

(IX)

wherein $R_f''''$ is selected from a perfluorinated alkyl group having from 1 to 4 carbon atoms, and n is from 1 to 10.

Other embodiments of partially fluorinated liquids include those selected from fluorinated polyethers of formula (X):

(X)

In formula (X), $R_f'''$ may be selected from a perfluorinated alkyl group having from 1 to 10 carbon atoms and R may be selected from $CH_3$ and $R_f'''$, wherein when R is $R_f'''$, it may be the same or different than the other $R_f'''$.

In yet other embodiments, fluorinated liquids include perfluorinated hydrocarbons such as, for instance, perfluorinated saturated aliphatic compounds such as a perfluorinated alkane; a perfluorinated aromatic compound such as perfluorinated benzene, or perfluorinated tetradecahydrophenanthene. Perfluorinated liquids also include perfluorinated alkyl amines such as a perfluorinated trialkyl amine. Furthermore, the perfluorinated liquid may be a perfluorinated cyclic aliphatic, such as decalin; and preferably a heterocyclic aliphatic compound containing oxygen, nitrogen or sulfur in the ring, such as perfluorinated N-alkyl substituted morpholines or perfluoro-2-butyl tetrahydrofuran. Other embodiments include perfluoropolyethers such as, for instance, those available under the trade names Galden™, Fomblin™ (available from Solvay Solexis); Demnum™ SH (available from Daikin); and Krytox™ (available from DuPont).

Specific examples of perfluorinated hydrocarbons include perfluoro-2-butyltetrahydrofuran, perfluorodecalin, perfluoromethyldecalin, perfluoromethyldecalin, perfluoromethylcyclohexane, perfluoro(1,3-dimethylcyclohexane), perfluorodimethyldecahydronaphthalene, perfluoro(tetradecahydrophenanthrene), perfluorotetracosane, perfluorokerosenes, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75, FC-72, FC-84, FC-77, FC-40, FC-43, FC-70 or FC 5312 all available from 3M Company, Saint Paul, Minn. The fluorinated alkanes can be linear or branched, with a carbon atom number between 3 and 20.

In some embodiments, the polymerization is carried out in the presence of an aqueous mixture, where the aqueous mixture, prior to addition to the polymerization medium, is in the form of a micro-emulsion.

Micro-emulsions are generally characterized by being thermodynamically stable and having a particle size of from about 5 to 50 nm. See, for instance, Applied Surfactants, Tadros, Tharwat F., Chapter 10 (2005). They are obtainable though any technique known to produce micro-emulsions, such as heating a mixture of concentrated surfactant solution (e.g., the concentration of surfactant is greater than the critical micelle concentration for the surfactant) and a fluorinated liquid until the mixture is transparent. The mixture is then cooled. This micro-emulsion can then be added to the polymerization process as described generally herein. In this embodiment, the fluorinated surfactant-fluorinated liquid mixture may or may not remain as a micro-emulsion after it is added to the polymerization reactor.

In this embodiment, upon addition to the polymerization reactor, the amount of fluorinated liquid in the aqueous phase of the emulsion polymerization may be, for instance, not more than 1% by weight based on the aqueous phase.

Generally, the amount of fluorinated liquid in such embodiments will be not more than 0.5% by weight, not more than 0.2% by weight, or even less than 0.1% by weight. Even amounts of not more than 0.01% by weight have been found to produce meritorious effects in the aqueous emulsion polymerization.

The fluorinated surfactant concentration in the aqueous dispersion may be, for instance, up to 1% by weight, 0.01 to 1% by weight, or even 0.005% to 0.4% based on the weight of the aqueous dispersion.

Part or all of the fluorinated surfactant used in the aqueous emulsion polymerization may be added as a mixture with fluorinated liquid. Generally at least 5% by weight, preferably at least 10% by weight of the total amount of fluorinated surfactant used will be added in the form of a mixture with the fluorinated liquid. If only part of the fluorinated surfactant is added under the form of a mixture with fluorinated liquid, the remainder of the fluorinated surfactant may be added separately to the aqueous phase, e.g. prior to the addition of the mixture of fluorinated surfactant and fluorinated liquid.

In another embodiment, the aqueous mixture is an emulsion that contains a polymerizable fluorinated liquid, along with the fluorinated surfactant. In such embodiments, the amount of fluorinated liquid in the aqueous mixture is 70% or less by weight based on the total weight of the aqueous mixture. For instance, 60% or less, 50% or less, or even 40% or less. The fluorinated liquid may be present in the aqueous mixture in an amount of 1% or greater, 5% or greater, 10% or greater, even 20% or greater.

The fluorinated liquid is mixed with the aqueous solution of the fluorinated surfactant and is emulsified therein such that droplets having an average droplet diameter of not more than 2000 nm, preferably from 50 to 1500 nm, more preferably from 100 to 1300 nm are obtained.

Emulsions containing particles having an average droplet diameter of from 50 to 500 nm can be obtained by any suitable emulsifying apparatus such as those available from the company Microfluidics (Newton, Mass.).

Emulsions containing particle having an average droplet diameter of from 500 nm and higher, for instance, from 500 to 2000 nm, can be obtained using an Ultra Turrax™ high-shear mixer.

Aqueous mixtures may be added to an aqueous emulsion polymerization reaction in any manner that is convenient. For instance, the entire amount of the aqueous mixture may be added before the initiation of polymerization, it may be added during polymerization, or may be added in part before the initiation of polymerization, with the remainder of the mixture being added during polymerization.

The mixture of the fluorinated surfactant and fluorinated liquid may further be obtained by a predetermined contamination with the fluorinated liquid of the solid, or liquid fluorinated surfactant or molded acid or ester derivative of the fluorinated surfactant. For example, the process of contamination may involve re-crystallization of the surfactant.

Still further, a mixture of fluorinated surfactant and fluorinated liquid can be prepared in the preparation of the fluorinated surfactant. For example, the corresponding acid of the fluorinated surfactants according to formulae (II)-(VI) may be distilled in the presence of the fluorinated liquid. Subsequently the acid may be converted into its salt form, for example by adding ammonia if an ammonium salt is desired. The fluorinated liquid may for example be added to the corresponding acid of the fluorinated surfactant and the mixture may then be distilled which will result in the distillate containing a mixture of acid and fluorinated liquid.

The aqueous mixture of the fluorinated surfactant and fluorinated liquid can then be obtained by converting the contaminated fluorinated surfactants or acid or ester derivatives to the salts, and adding to water.

The methods described herein may have aqueous phases that further comprise a second fluorinated surfactant, which may be any fluorinated surfactant known for use in aqueous emulsion polymerization of fluorinated monomers. Particularly, the aqueous phase may comprise fluorinated surfactants including those according to formula (XI):

Y—R$_f$—Z-M  (XI)

In formula (XI), Y represents hydrogen, Cl or F; R$_f$ represents a linear or branched perfluorinated alkylene having 4 to 10 carbon atoms; Z represents COO$^-$ or SO$_3^-$ and M represents a monovalent cation such as for example an alkali metal ion or an ammonium ion. Mixtures of second fluorinated surfactants can also be used. In one embodiment, the second fluorinated surfactant is an ammonium or metal salt of perfluorooctanoic acid or perfluorooctanesulphonic acid. In certain embodiments, when a second fluorinated surfactant of formula (X) is present, the fluorinated surfactant may be selected from perfluorinated mono-ether carboxylic acids and partially fluorinated ether carboxylic acids (including mono- and poly-ether carboxylic acids).

In yet another embodiment, the polymerization itself can be carried out in a micro-emulsion. That is, when the polymerizing is carried out in the presence of a fluorinated surfactant and a fluorinated liquid, the fluorinated surfactant and fluorinated liquid are in the form of a micro-emulsion.

The aqueous emulsion polymerization process is generally conducted under commonly employed conditions. Polymerization temperatures may range from 0 to 150° C., from 10 to 100° C., or from 30° C. to 80° C. The total pressure of the headspace in the reactor may be kept at any pressure, for instance, from 4 to 30 bar, or from 8 to 20 bar.

The aqueous emulsion polymerization process can be used to produce any of the known fluoropolymers, i.e. polymers that have a partially or fully fluorinated backbone. In particular, the aqueous emulsion polymerization process can be used to produce homo- and copolymers of gaseous fluorinated olefinic monomers such as tetrafluoroethylene, vinylidene fluoride and chlorotrifluoroethylene. Suitable comonomers include fluorinated monomers such as hexafluoropropene, perfluoro vinyl ethers including perfluoroalkyl vinyl ethers such as perfluoromethyl vinyl ether and perfluoro-n-propylvinyl ether and perfluoroalkoxy vinyl ethers such as those corresponding to formula (XII):

$$CF_2=CFO(R^1O)_n(R^2O)_mR^3 \qquad (XII)$$

wherein $R^1$ and $R^2$ are each independently selected from a linear or branched perfluoroalkylene group having from 2 to 6 carbon atoms, m and n are each independently from 0 to 10, with the proviso that the sum of n and m is at least 1, and $R^3$ is a perfluoroalkyl group of from 1 to 6 carbon atoms. Combinations of any of the above-named fluorinated monomers are also contemplated.

Further particular monomers include, for instance, $CF_2=CF-O-(CF_2)_4-SO_2F$ (MV4S); $CF_2=CF-O-(CF_2)_5CN$ (MV5CN); $CF_2=CFCF_2-O-(CF_2)_n-O-CF_3$ where n is 1 to 5 (MA"n"1, for instance, MA31 corresponds to n=3); and $CF_2=CF-O-(CF_2)_n-O-CF_3$ where n is 1 to 5 (MV"n"1, for instance, MV31 corresponds to n=3).

Non-fluorinated monomers that can be used as comonomers include alpha-olefins, e.g. ethylene and propylene. The process of the invention can be used to produce fluoroelastomers as well as fluorothermoplasts.

The aqueous emulsion polymerization is typically initiated by an initiator including any of the initiators known for initiating a free radical polymerization of fluorinated monomers. Suitable initiators include peroxides and azo compounds and redox based initiators. Specific examples of peroxide initiators include, hydrogen peroxide, sodium or barium peroxide, diacylperoxides such as diacetylperoxide, disuccinoyl peroxide, dipropionylperoxide, dibutyrylperoxide, diglutaric acid peroxide, and further per-acids and salts thereof such as e.g. ammonium, sodium or potassium salts. Examples of per-acids include peracetic acid. Esters of the peracid can be used as well. Examples of inorganic initiators include for example ammonium- alkali- or earth alkali salts of persulfates, permanganic or manganic acid or manganic acids.

A persulfate initiator, e.g. ammonium persulfate (APS), may be used alone or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit®, available from BASF, Germany) or fluoroalkyl sulfinates. The reducing agent typically reduces the half-life time of the persulfate initiator. Additionally, a metal salt catalyst such as for example copper, iron or silver salts may be added.

The aqueous emulsion polymerization system may further comprise other materials, such as buffers and, if desired, complex-formers or chain-transfer agents.

The achievable solids content of the polymer dispersion is typically from 5 to 40% without any major coagulum. The resultant dispersions are highly stable and generally have an number average particle diameter of not more than 400 nm, typically between 50 and 350 nm average particle sizes can be achieved.

The fluoropolymer may be isolated from the dispersion by coagulation if a polymer in solid form is desired. Also, depending on the requirements of the application in which the fluoropolymer is to be used, the fluoropolymer may be post-fluorinated so as to convert any thermally unstable end groups into stable $CF_3$ end groups. Generally, when the fluoropolymer is post fluorinated, it is post fluorinated such that the amount of end groups in the fluoropolymer other than $CF_3$ is less than 80 per million carbon atoms.

For coating applications, an aqueous dispersion of the fluoropolymer may be desired and hence the fluoropolymer may not need to be separated or coagulated from the dispersion. To obtain a fluoropolymer dispersion for use in coating applications such as, for example, in the impregnation of fabrics or in the coating of metal substrates to make for example cookware, further stabilizing surfactants may be added and/or the level of fluoropolymer solids may be increased. For example, non-ionic stabilizing surfactants may be added to the fluoropolymer dispersion. Typically these will be added to an aqueous fluoropolymer dispersion in an amount of 1 to 12% by weight based on fluoropolymer solids. Examples of non-ionic surfactants that may be added include:

$$R^1—O—[CH_2CH_2O]_n—[R^2O]_m—R^3 \quad (XIII)$$

wherein $R^1$ represents an aromatic or aliphatic hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2. It will be understood that in the above formula (XIII), the units indexed by n and m may appear as blocks or they may be present in an alternating or random configuration. Examples of non-ionic surfactants according to formula (XIII) above include alkylphenol oxy ethylates such as ethoxylated p-isooctylphenol commercially available under the brand name TRITON™ such as for example TRITON™ X 100 wherein the number of ethoxy units is about 10 or TRITON™ X 114 (available from Dow Chemical, Midland, Mich.) wherein the number of ethoxy units is about 7 to 8. Still further examples include those in which $R^1$ in the above formula (XII) represents an alkyl group of 4 to 20 carbon atoms, m is 0 and $R^3$ is hydrogen. An example thereof includes isotridecanol ethoxylated with about 8 ethoxy groups and which is commercially available as GENAPOL®X080 (available from Clariant GmbH, Germany). Non-ionic surfactants according to formula (XII) in which the hydrophilic part comprises a block-copolymer of ethoxy groups and propoxy groups may be used as well. Such non-ionic surfactants are commercially available from Clariant GmbH under the trade designation GENAPOL® PF 40 and GENAPOL® PF 80.

The amount of fluoropolymer solids in the dispersion may be up-concentrated as needed or desired to an amount between 30 and 70% by weight. Any of the known up-concentration techniques may be used including ultra-filtration and thermal up-concentration.

In some embodiments the surfactant may be removed or reduced from fluoropolymer dispersions described herein. The methods for removal include those generally known in the art including those described in U.S. Pat. No. 6,833,403, Blädel, et al.

Applications for the fluoropolymers and fluoropolymer dispersions made from the processes described herein include those commonly known for fluoropolymers. These applications include, for instance, those described in Fluoroplastics: Vol. 1, Non-Melt Processible Fluoroplastics, Ebnesajjad, Chapter 17 (2000) and Fluoroplastics: Vol. 2, Melt Processible Fluoropolymers, Ebnesajjad, Parts II and III (2003).

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Test Methods

Particle Size

The latex particle size determination was conducted by means of dynamic light scattering with a Malvern Zetasizer 1000 HAS in accordance to ISO/DIS 13321. Prior to the measurements, the polymer latexes as yielded from the polymerizations were diluted with 0.001 mol/L KCl-solution, the measurement temperature was 25° C. in all cases. The reported average is the Z-average particle diameter.

SSG

Standard specific gravity was measured according ASTM 4895-04

Solid Content

Determination of solid content was done by subjecting the latex sample to a temperature up to 250° C. for 30 min.

Hexafluoropropylene (HFP) Content

The HFP content was measured via FTIR-spectroscopy as described in U.S. Pat. No. 4,552,925. The absorbances, A, at the wave-numbers of 980 cm$^{-}$ and 2350 cm$^{-}$ ($A_{980}$ and $A_{2350}$ respectively), were measured using a film of 0.05+0.01 mm in thickness with a Nicolet Magna 560 FTIR spectrometer. The HFP content was calculated according to the following equation:

$$\text{HFP content(weight percent)} = A_{980}/A_{2350} * 3.2$$

Example 1

Preparation of Emulsifier 800 g of perfluoro-3,5,7,9-tetraoxadecanoic acid ($CF_3$—$(OCF_2)_4$—COOH) (hereinafter Compound I) available from Anles Trade (Russia) and 1754 g of deionized water were introduced into a glass vessel equipped with a mechanical stirrer and a condenser. 150 g of an aqueous ammonia solution (25% by weight) was added dropwise to the mixture over a period of about 2 hours under stirring. The final clear and colorless solution had a pH of about 8.

Example 2

Preparation of a Microemulsion 392 g of ammonium salt of Example 1 and 8 g of Fluoroinert FC-70, available from 3M Company, Saint Paul, Minn., was introduced into a glass vessel equipped with a mechanical stirrer and a reflux condenser. The resulting dispersion was heated to 83° C. under mild stirring for about 8 hours and cooled to room temperature. A perfectly limpid solution containing 2% by weight (confirmed by gas chromatographic analysis) of the Fluoroinert was obtained.

Example 3

Comparative Example

The polymerization experiments were performed in a 40 liter kettle equipped with an impeller agitator and a baffle. The kettle was charged with 30 liters of deionized water and set to 35° C. The kettle was evacuated repeatedly and pressurized with nitrogen to remove oxygen. The agitator speed was set to 165 rpm. The oxygen-free kettle was charged with 70 mmol of fluorinated emulsifier from Example 1 and the following materials were added: 1.06 ml of a solution containing 40 mg of copper sulfate pentahydrate and 1 mg of concentrated sulfuric acid; 15 g of a 25 weight % aqueous ammonia solution and 5.5 g of PPVE-2. Finally, the reactor was pressurized with tetrafluoroethylene (TFE) to 0.2 MPa and 47 g of hexafluoropropylene (HFP) were added. The kettle was then set to 1.5 MPa by pressurizing with TFE. To start the polymerization, 20 ml of a an aqueous initiator solution containing 140 mg of sodium sulfite followed by 20 ml of a solution containing 340 mg of ammonium peroxodisulfate were pumped into the reactor. The beginning of the polymerization was indicated by a pressure drop. During polymerization, the pressure was maintained at 1.5 MPa by continuously feeding TFE into the kettle. After 3.2 kg of TFE had been added, the TFE inlet valve was closed and the pressure was released.

1000 ml of this polymer dispersion was coagulated by adding 20 ml of concentrated hydrochloric acid under agitation. The coagulated material was agglomerated with gasoline and washed repeatedly. The agglomerated polymer was dried overnight at 200° C. in a vacuum oven. Polymerization data and product characteristics are given in table 2.

Example 4

Example 4 was carried out as in Comparative Example 3, except that 70 mmol of emulsifier containing 2 weight % of Fluoroinert FC-70 as described in Example 2 was added to the kettle instead of the 90 mmol of fluorinated emulsifier described in Comparative Example 3.

TABLE 1

|  | Example 3 (Comparative) | Example 4 |
| --- | --- | --- |
| Polymerization time (min) | 91 | 101 |
| Average Particle Size (nm) | 110 | 72 |
| SSG (g/cm3) | 2.171 | 2.189 |
| Solid Content (wt %) | 10.1 | 10.1 |
| HFP Content (% m/m) | 0.28 | 0.26 |
| pH | 9.5 | 9.6 |

Determination of Bio-Accumulation

The fluorinated surfactants were evaluated for urinary clearance using a pharmacokinetic study in rats. The goal was to measure the total amount of parent compound eliminated via urinary output and estimate the rate of elimination. The study was approved by the IACUC (Institutional Animal Care and Use Committees) and was performed in 3M Company's AAALAC (Association for Assessment and Accreditation of Laboratory Animal Care)-accredited facility.

The study utilized male Sprague Dawley rats, 6 to 8 weeks of age, and approximately 200 to 250 g body weight at study onset. The test compounds of table 2 were administered at a dose of 73 micromoles per kg body weight in rats (N=3 animals per tested compound). All test compounds were prepared in sterile deionized water and given to rats via oral gavage. After test compounds administration, the rats were housed individually in metabolism cages for urine collection: 0 to 6 hours, 6 to 24 hours, 24 to 48 hours and 72 to 96 hours. Animals were observed throughout the study for clinical signs of toxicity. Gross necropsy was performed at the termination of each study (96 hours post-dose) with sera and liver samples being retained from each animal The concentration of the parent compound or metabolites thereof were quantitatively measured via fluorine NMR on each urine sample for each animal at each time point based on internally added standards.

The bioaccumulation data obtained in accordance with the above test are reported in table 3.

TABLE 3

|  | T½ (h) | % Recovery (96 h) | Compound-related Effects |
| --- | --- | --- | --- |
| $C_7F_{15}COONH_4$ | ~550 | 6 | Hepatomegaly |
| Compound 1 | 15 | 50 | — |

* $T_{1/2}$ is the time required for the amount of a particular substance in a biological system to be reduced by one half by biological processes when the rate of removal is approximately exponential. In these examples the value of $T_{1/2}$ is calculated by exponential least squares curve fitting ($y = Ae^{Bx}$ and $T_{1/2} = 0.693/B$) where y represents the concentration of analyte in urine and x represents time in hours.

What is claimed is:

1. A method of making a fluoropolymer comprising polymerizing one or more fluorinated monomers in an aqueous emulsion polymerization in the presence of a fluorinated surfactant selected from fluorinated surfactants of formula (V)

$$R_f^2—(O)CHF—(CF_2)—X \qquad (V)$$

wherein $R_f^2$ represents a fully fluorinated linear aliphatic group interrupted with one or more oxygen atoms, X is a carboxylic acid or salt thereof, and each aliphatic portion of the fluorinated surfactant has not more than three carbon atoms;

further wherein at least part of the fluorinated surfactant is added to the aqueous phase as an aqueous mixture with at least one non-polymerizable fluorinated liquid.

2. The method of claim 1 wherein the fluorinated liquid is perfluorinated.

3. The method of claim 1, wherein the fluorinated liquid is selected from the group consisting of a perfluoroalkane; a perfluorinated N-alkyl substituted morpholine; $(R_f^t)_3N$, wherein each $R_f^t$ is independently selected from a fluorinated alkyl group having from 1 to 10 carbon atoms; and combinations thereof.

4. The method of claim 1 wherein the fluorinated liquid is selected from perfluoropolyethers of formula (VIII):

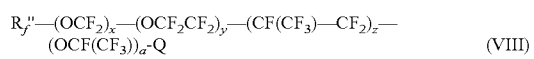

$$R_f''—(OCF_2)_x—(OCF_2CF_2)_y—(CF(CF_3)—CF_2)_z—(OCF(CF_3))_a-Q \qquad (VIII)$$

wherein $R_f''$ is selected from perfluoroalkyl groups having from 1 to 10 carbon atoms; Q is selected from $R_f''$ and $R_f''$—$(OCF_2)_x$—$(OCF_2CF_2)_y$—$(CF(CF_3)$—$CF_2)_z$—$(OCF(CF_3))_a$; each x, y, z, and a is independently selected from 0 to 10 with the proviso that the sum of x+y+z+a is at least 1.

5. The method of claim 1 wherein the fluorinated liquid is selected from fluorinated polyethers of formula (X):

$$Rf'''—O—CFH—CF_2—O—R \quad (X)$$

wherein $R_f'''$ is selected from a perfluorinated alkyl group having from 1 to 10 carbon atoms and R is selected from $CH_3$ and $R_f'''$, wherein when R is $R_f'''$, it may be the same or different than the other $R_f'''$.

6. The method of claim 1 wherein the fluorinated liquid is selected from fluorinated polyethers of the formula (IX):

$$R_f''''—[OC_3F_6]_n—O—CHFCF_3 \quad (IX)$$

wherein $R_f''''$ is selected from a perfluorinated alkyl group having from 1 to 4 carbon atoms, and n is from 1 to 10.

7. The method of claim 1 wherein the fluorinated liquid has a boiling point of at least 100° C.

8. The method of claim 1 wherein the amount of fluorinated surfactant is not more than 1.0% by weight based on the weight of the aqueous mixture.

9. The method of claim 1 wherein the aqueous phase further comprises a second fluorinated surfactant corresponds to the following general formula (XI):

$$Y—R_F—Z—M \quad (XI)$$

wherein Y represents hydrogen, Cl or F; $R_F$ represents a linear or branched perfluorinated alkylene having 4 to 10 carbon atoms; Z represents COO— or $SO_3$— and M represents a monovalent cation.

10. The method of claim 1 wherein the amount of the fluorinated liquid in the aqueous mixture is between 0.1 and 70% by weight relative to the total weight of the aqueous mixture.

11. The method of claim 1 wherein the anion of the fluorinated surfactant has a molecular weight of not more than 1000 grams per mole.

12. The method of claim 1 wherein the fluorinated surfactant, when administered to a rat, has a renal recovery rate of at least 50% of the administered amount 96 hours after administration and further wherein the renal half-life is not more than 30 hours.

13. The method of claim 1 wherein the amount of fluorinated surfactant is from 1 to 40% by weight based on the weight of the aqueous mixture.

14. The method of claim 1 wherein the fluorinated surfactant forms a microemulsion with the non-polymerizable fluorinated liquid.

15. The method of claim 1 wherein the aqueous mixture comprises droplets having an average particle size of from 5 to 2000 nm.

16. The method of claim 1 wherein the amount of fluorinated surfactant is less than 1% by weight based on the weight of the aqueous dispersion.

* * * * *

UNITED STATES PATENT AND TRADEMARK OFFICE
CERTIFICATE OF CORRECTION

PATENT NO. : 8,404,790 B2
APPLICATION NO. : 13/403724
DATED : March 26, 2013
INVENTOR(S) : Klaus Hintzer et al.

Page 1 of 2

It is certified that error appears in the above-identified patent and that said Letters Patent is hereby corrected as shown below:

On the Title Page, Item (56)

Column 1
Line 7, (Other Publications), Delete "Emulusion" and insert -- Emulsion --, therefor.

Column 2
Line 18, (Other Publications), Delete "Nuclephiles" and insert -- Nucleophiles --, therefor.
Line 18, (Other Publications), Delete "Chlorotrifluorothylene" and insert
-- Chlorotrifluoroethylene --, therefor.
Line 24, (Other Publications), Delete "Sulfaonate" and insert -- Sulfonate --, therefor.
Line 24, (Other Publications), Delete "Wasterwater" and insert -- Wastewater --, therefor.

In the Specification

Column 3
Line 24, Delete "(CF2)" and insert -- $(CF_2)$ --, therefor.
Line 66, Delete "(CF2)" and insert -- $(CF_2)$ --, therefor.

Column 9
Line 33, Delete "20150° C." and insert -- 20-150° C. --, therefor.

Column 11-12
Line 67 & 1, Delete "tetradecahydrophenanthene." and insert -- tetradecahydrophenanthrene. --,
therefor.

Column 16
Line 61, Delete "I)" and insert -- 1) --, therefor.

Signed and Sealed this
Third Day of June, 2014

Michelle K. Lee
*Deputy Director of the United States Patent and Trademark Office*

CERTIFICATE OF CORRECTION (continued)
U.S. Pat. No. 8,404,790 B2

Column 17
Line 32, Delete "a an" and insert -- an --, therefor.
Line 59, Delete "(g/cm3)" and insert -- (g/cm$^3$) --, therefor.

Column 18
Line 22, Delete "animal" and insert -- animal. --, therefor.

In the Claims

Column 18
Line 61, In Claim 3, delete "$R_f'$is" and insert -- $R_f'$ is --, therefor.

Column 19
Line 10, In Claim 5, delete "$R_f'''$is" and insert -- $R_f'''$ is --, therefor.
Line 18, In Claim 6, delete "$R_f''''$is" and insert -- $R_f''''$ is --, therefor.

Column 20
Line 3, In Claim 9, delete "COO— or SO$_3$—" and insert -- COO$^-$ or SO$_3$– --, therefor.
Line 14, In Claim 12, delete "96hours" and insert -- 96 hours --, therefor.